3,105,096
ORGANOPHOSPHORUS HETEROCYCLIC COMPOUNDS AND METHODS FOR PREPARING SAME
Richard Parke Welcher, Old Greenwich, Conn., assignor to American Cyanamid Company, New York, N.Y., a corporation of Maine
No Drawing. Filed Dec. 22, 1961, Ser. No. 161,404
9 Claims. (Cl. 260—606.5)

The present invention relates to organophosphorus compounds and preparation of same. More particularly, the instant discovery concerns 4-phosphorinanols of the formula

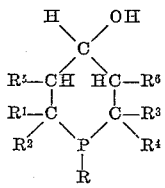

prepared from 4-phosphorinanones of the formula

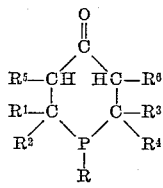

R in the above formulae represents a member selected from the group consisting of substituted and unsubstituted, branched and straight chain alkyl ($C_1$–$C_{18}$), substituted and unsubstituted cycloalkyl, substituted and unsubstituted aryl; $R^1$, $R^2$, $R^3$ and $R^4$ each represent a member selected from the group consisting of hydrogen, lower alkyl, phenyl, lower alkyl-substituted phenyl, cyclohexyl and lower alkoxyalkyl; and $R^5$ and $R^6$ each represent a member selected from the group consisting of hydrogen, lower alkyl, and phenyl.

The 4-phosphorinanone reactants are prepared according to copending U.S. application, Serial No. 161,405 filed simultaneously herewith on December 22, 1961, by reacting a primary phosphine $RPH_2$ with a divinyl ketone (1,4-dien-3-one) of the formula

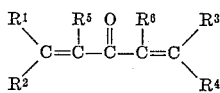

and recovering the corresponding phosphorinanone.

The primary phosphine reactant and the 1,4-dien-3-one reactant are best reacted at a temperature in the range of 80° C. to 200° C. and recovering the resulting 4-phosphorinanone product by volatilization, for example, at a reduced pressure in the range of 0 to 760 millimeters. Reaction is best carried out in a substantially inert atmosphere, such as in a nitrogen or helium atmosphere, or the like. No catalyst or solvent is necessary for the process contemplated herein.

Furthermore, the process is generally carried out at atmospheric pressure. Superatmospheric pressures as high as 700 pounds per square inch may likewise be used, particularly with low boiling reactants. Usually, however, very good results are achieved at atmospheric pressure.

Similarly, stoichiometric quantities of the reactants are generally employed. Nevertheless, small excesses of either reactant may be present without detrimentally affecting the nature of the reaction.

Generally, the reactants are heated for at least one hour, but this is not critical since incipient reaction occurs upon intermingling the reactants.

Typical primary phosphines useful for producing 4-phosphorinanone reactants within the purview of the instant discovery are phenylphosphine cyclohexylphosphine, dodecylphosphine, isopropylphosphine, benzylphosphine, 2-ethoxyethylphosphine, 2-cyanoethylphosphine, parachlorophenylphosphine, methylphosphine, isobutylphosphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc.

It follows from the above listing that typical substituents for primary alkyl phosphine are lower alkoxy, phenyl, cyano and the like. Typical substituents for primary aryl phosphine, such as phenyl phosphine, are halogen (e.g. Cl, Br, and I) lower alkyl, etc.

In other words, substituents which do not interfere with, enter into, i.e., are inert under the conditions of, the reaction for preparing 4-phosphorinanones are contemplated herein.

Among the divinyl ketones useful for preparing the 4-phosphorinanone reactants of the present invention are:

1,4-hexadien-3-one
1,4-heptadien-3-one
1,4-octadien-3-one
7-methyl-1,4-octadien-3-one
5-methyl-1,4-hexadien-3-one
5-methyl-1,4-heptadien-3-one
5-methyl-1,4-octadien-3-one
5-ethyl-1,4-heptadien-3-one
5-propyl-1,4-octadien-3-one
1-cyclohexylidene-3-buten-2-one
5-phenyl-1,4-hexadien-3-one
5-(2'-methoxyethyl)-1,4-nonadien-3-one
divinyl ketone
2,5-heptadien-4-one
2-methyl-2,5-heptadien-4-one
2,8-dimethyl-3,6-nonadien-5-one
phorone or 2,6-dimethyl-2,5-heptadiene-4-one
2,7-dimethyl-3,6-octadien-5-one
4,6-dimethyl-3,7-diethyl-3,6-nonadien-5-one
2,4-dipropyl-1,4-pentadien-3-one
3,7-diethyl-3,6-nonadien-5-one
5-methyl-9-ethyl-4,7-tridecadien-6-one
dibenzalacetone
4,4'-dichlorodibenzalacetone
4,4'-dimethyldibenzalacetone
dicuminylideneacetone
2-chlorodibenzalacetone
3-chlorodibenzalacetone
4-chlorodibenzalacetone
2,3'-dichlorobenzalacetone
2,4'-dichlorobenzalacetone
3,4'-dichlorobenzalacetone The 4-phosphorinanone reactants of the present invention, produced, as above, are converted to the corresponding 4-phosphorinanol products according to the following general reaction:

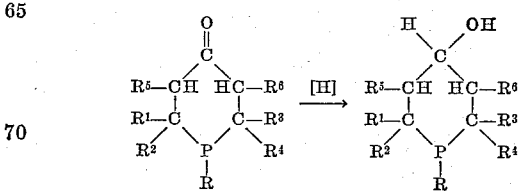

A typical reaction is the following:

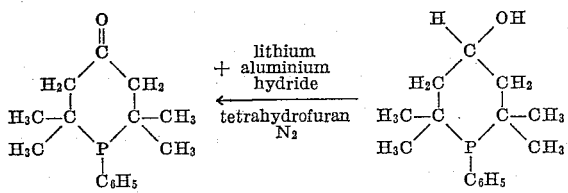

The instant discovery will be understood from the examples given infra. Examples I to XXXII are directed to the preparation of the 4-phosphorinanone reactants. The remaining examples in Arabic numerals are directed to the preparation of 4-phosphorinanols from the 4-phosphorinanone reactants.

EXAMPLE I

*2,2,6,6-Tetramethyl-1-Phenyl-4-Phosphorinanone*

A mixture of 7.0 grams (0.051 mole) of 2,6-dimethyl-2,5-heptadien-4-one and 5.6 grams (0.051 mole) of phenylphosphine (transferred with a hypodermic syringe) is heated under a nitrogen at 115° C.–130° C. for 6 hours. The solution, still yellow green, crystallizes on cooling.

Vacuum distillation gives a total of 9.7 grams of yellowish waxy solid. It is soluble in cold benzene, ether, chloroform, methanol, 2B alcohol[1], and acetone, soluble in hot acetonitrile, and insoluble in hot hexane and water.

Sublimation of this yellowish waxy solid gives white crystals of 2,2,6,6-tetramethyl-1-phenyl-4-phosphorinanone.

The following table teaches Examples II to XXXII, carried out essentially as Example I, with temperature modifications:

TABLE I

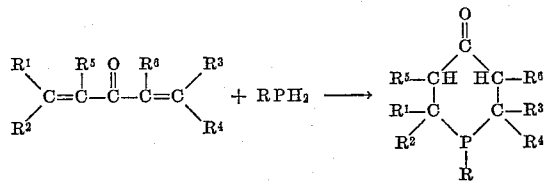

| Example No. | (A) Divinyl Ketone | (B) Primary Phosphine | Temp., °C. | (C) Product |
|---|---|---|---|---|
| II | 1,4-hexadien-3-one | phenylphosphine | 115 | 2-methyl-1-phenyl-4-phosphorinanone. |
| III | 1,4-heptadien-3-one | cyclohexylphosphine | 180 | 1-cyclohexyl-2-ethyl-4-phosphorinanone. |
| IV | 1,4-octadien-3-one | isobutylphosphine | 100 | 1-isobutyl-2-propyl-4-phosphorinanone. |
| V | 7-methyl-1,4-octadien-3-one | methylphosphine | 80 | 2-isobutyl-1-methyl-4-phosphorinanone. |
| VI | 5-methyl-1,4-hexadien-3-one | 2-cyanoethylphosphine | 200 | 1-(2'-cyanoethyl)-2,2-dimethyl-4-phosphorinanone. |
| VII | 5-methyl-1,4-heptadien-3-one | octylphosphine | 160 | 2-ethyl-2-methyl-1-octyl-4-phosphorinanone. |
| VIII | 5-methyl-1,4-octadien-3-one | propylphosphine | 90 | 2-methyl-1,2-dipropyl-4-phosphorinanone. |
| IX | 5-ethyl-1,4-heptadien-3-one | octadecylphosphine | 170 | 2,2-diethyl-1-octadecyl-4-phosphorinanone. |
| X | 5-propyl-1,4-octadien-3-one | dodecylphosphine | 160 | 1-dodecyl-2,2-dipropyl-4-phosphorinanone. |
| XI | 1-cyclohexylidene-3-buten-5-one | phenylphosphine | 160 | 1-phenyl-1-phosphaspiro [5.5] undecan-4-one. |
| XII | 5-phenyl-1,4-hexadien-3-one | do | 150 | 2-methyl-1,2-diphenyl-4-phosphorinanone. |
| XIII | 5-(2'-methoxyethyl)-1,4-nonadien-3-one | octylphosphine | 170 | 2-butyl-2(2'-methoxyethyl)-1-octyl-4-phosphorinanone. |
| XIV | divinyl ketone | 2-cyanoethyl-phosphine | 180 | 1-(2'cyanoethyl)-4-phosphorinanone. |
| XV | 2,5-heptadien-4-one | pentylphosphine | 110 | 2,6-dimethyl-1-pentyl-4-phosphorinanone. |
| XVI | 2-methyl-2,5-heptadien-4-one | phenylphosphine | 140 | 2,2,6-trimethyl-1-phenyl-4-phosphorinanone. |
| XVII | 2,6-dimethyl-2,5-heptadien-4-one | heptadecylphosphine | 150 | 1-heptadecyl-2,2,6,6-tetramethyl-4-phosphorinanone. |
| XVIII | 2,8-dimethyl-3,6-nonadien-5-one | para-chlorophenyl-phosphine | 175 | 1-parachlorophenyl-2,6-di-isopropyl-4-phosphorinanone. |
| XIX | 4,6-dimethyl-3,7-diethyl-3,6-nonadien-5-one | phenylphosphine | 150 | 2,2,6,6-tetraethyl-3,5-dimethyl-1-phenyl-4-phosphorinanone. |
| XX | 2,4-dipropyl-1,4-pentadien-3-one | do | 150 | 1-phenyl-3,5-dipropyl-4-phosphorinanone. |
| XXI | 3,7-diethyl-3,6-nonadien-5-one | 2'-ethoxyethylphosphorine | 130 | 1-(2'ethoxyethyl)-2,2,6,6-tetraethyl-4-phosphorinanone. |
| XXII | 5-methyl-9-ethyl-4,7-tridecadien-6-one | heptadecylphosphine | 150 | 2-ethylpentyl-6-propyl-1-heptadecyl-4-phosphorinanone. |
| XXIII | dibenzalacetone | phenylphosphine | 120 | 1,2,6-triphenyl-4-phosphorinanone. |
| XXIV | 4,4'-dichlorodibenzalacetone | octylphosphine | 160 | 2,6-di(4'-chlorophenyl)-1-octyl-4-phosphorinanone. |
| XXV | 4,4'-dimethyldibenzalacetone | 2-cyanoethylphosphine | 175 | 1-(2'-cyanoethyl)-2,6-di-(4''-methylphenyl)-4-phosphorinanone. |
| XXVI | dicuminylideneacetone | propylphosphine | 115 | 1-propyl-2,6-di-isopropyl-phenyl-4-phosphorinanone. |
| XXVII | 2-chlorodibenzalacetone | cyclohexylphosphine | 120 | 2-chlorophenyl-1-cyclohexyl-6-phenyl-4-phosphorinanone. |
| XXVIII | 3-chlorodibenzalacetone | 2-ethoxyethylphosphine | 110 | 2-(3'-chlorophenyl)-1-(2''-ethoxyethyl)-6-phenyl-4-phosphorinanone. |
| XXIX | 4-chlorodibenzalacetone | decylphosphine | 170 | 2-(4'-chlorophenyl)-1-decyl-6-phenyl-4-phosphorinanone. |
| XXX | 2,3'-dichlorodibenzalacetone | phenylphosphine | 150 | 2-(2'-chlorophenyl)-6-(3''-chlorophenyl)-1-phenyl-4-phosphorinanone. |
| XXXI | 2,4'-dichlorodibenzalacetone | 2-butoxyethylphosphine | 115 | 1-(2'butoxyethyl)-2-(2''-chlorophenyl)-6-(4'''-chlorophenyl)-4-phosphorinanone. |
| XXXII | 3,4'-dichlorodibenzalacetone | undecylphosphine | 120 | 2-(3'-chlorophenyl)-6-(4''-chlorophenyl)-1-undecyl-4-phosphorinanone. |

The 4-phosphorinanone reactants produced as above may be converted to the corresponding 4-phosphorinanols as follows:

EXAMPLE 1

*2,2,6,6-Tetramethyl-1-Phenyl-4-Phosphorinanol*

A solution of 5 grams (0.02 mole) of 2,2,6,6-tetramethyl-1-phenyl-4-phosphorinanone in 75 milliliters of tetrahydrofuran is added during 45 minutes at room temperature to a slurry of 1.5 grams (0.04 mole) of powdered lithium aluminium hydride in 200 milliliters of tetrahydrofuran under a nitrogen atmosphere. After ---
[1] A solution made up by adding one-half gallon of benzene to one hundred gallons of 190 proof ethyl alcohol.

heating at 50° C. for 2 hours the mixture is cooled, treated cautiously with 20 milliliters of water and extracted with ether. After drying the ether is removed. The waxy residue is sublimed and recrystallized from hexane giving 2.8 grams of waxy crystallizine solid identified as 2,2,6,6-tetramethyl-1-phenyl-4-phosphorinanol.

The following examples are carried out essentially as in Example 1, just above, the modifications being given in the table:

TABLE II

| Example No. | 4-Phosphorinanone | Temp., °C. | LiAlH$_4$ | Solvent | Amount of Solvent | 4-Phosphorinanol |
|---|---|---|---|---|---|---|
| 2 | 2-methyl-1-phenyl-4-phosphorinanone. | 65 | 5 | dimethyl ether of ethylene glycol. | 28 | 2-methyl-1-phenyl-4-phosphorinanol. |
| 3 | 1-cyclohexyl-2-ethyl-4-phosphorinanone. | 55 | 8 | dioxane | 34 | 1-cyclohexyl-2-ethyl-4-phosphorinanol. |
| 4 | 1-isobutyl-2-propyl-4-phosphorinanone. | 40 | 15 | tetra-hydrofuran | 30 | 1-isobutyl-2-propyl-4-phosphorinanol. |
| 5 | 2-ethyl-2-methyl-1-octyl-4-phosphorinanone. | 85 | 10 | dimethyl ether of ethylene glycol | 40 | 2-ethyl-2-methyl-1-octyl-4-phosphorinanol. |
| 6 | 2-methyl-1, 2-dipropyl-4-phosphorinanone. | 60 | 17 | ___do___ | 32 | 2-methyl-1, 2-dipropyl-4-phosphorinanol. |
| 7 | 2,2-diethyl-1-octadecyl-4-phosphorinanone. | 70 | 12 | dioxane | 50 | 2, 2-diethyl-1-octadecyl-4-phosphorinanol. |
| 8 | 1-dodecyl-2,2-dipropyl-4-phosphorinanone. | 60 | 9 | ___do___ | 42 | 1-dodecyl-2,2-dipropyl-4-phosphorinanol. |
| 9 | 1-phenyl-1-phosphaspiro[5.5]undecan-4-one. | 20 | 6 | tetra-hydrofuran | 38 | 1-phenyl-1-phosphaspiro[5.5]undecan-4-ol. |
| 10 | 2-methyl-1,2-diphenyl-4-phosphorinanone. | 30 | 4 | dimethyl ether of diethylene glycol. | 29 | 2-methyl-1,2-diphenyl-4-phosphorinanol. |
| 11 | 2-butyl-2-(2'-methoxyethyl)-1-octyl-4-phosphorinanone. | 90 | 13 | ___do___ | 30 | 2-butyl-2-(2'-methoxyethyl)-1-octyl-4-phosphorinanol. |
| 12 | 2,2,6-trimethyl-1-phenyl-4-phosphorinanone. | 50 | 11 | dioxane | 29 | 2,2,6-trimethyl-1-phenyl-4-phosphorinanol. |
| 13 | 1-heptadecyl-2,2,6,6-tetramethyl-4-phosphorinanone. | 30 | 8 | tetrahydrofuran | 50 | 1-heptadecyl-2,2,6,6-tetramethyl-4-phosphorinanol. |
| 14 | 2,2,6,6-tetraethyl-3,5-dimethyl-1-phenyl-4-phosphorinanone. | 20 | 19 | dimethyl ether of diethylene glycol. | 53 | 2,2,6,6-tetraethyl-3,5-dimethyl-1-phenyl-4-phosphorinanol. |
| 15 | 1-phenyl-3,5-dipropyl-4-phosphorinanone. | 35 | 11 | tetrahydrofuran | 33 | 1-phenyl-3,5-dipropyl-4-phosphorinanol. |
| 16 | 1-(2'-ethoxyethyl)-2,2,6,6-tetraethyl-4-phosphorinanone. | 15 | 16 | dioxane | 28 | 1-(2'-ethoxyethyl)-2,2,6,6-tetraethyl-4-phosphorinanol. |
| 17 | 1-phenyl-3,5-dipropyl-4-phosphorinanone. | 70 | 10 | ___do___ | 35 | 1-phenyl-3,5-dipropyl-4-phosphorinanol. |
| 18 | 1,2,6-triphenyl-4-phosphorinanone. | 60 | 8 | tetrahydrofuran | 37 | 1,2,6-triphenyl-4-phosphorinanol. |

All amounts in above Table II are given in parts by weight.

EXAMPLE 19

*1-Isobutyl-1-Methyl-4-Phosphorinanol*

A solution of 10 parts of 1-isobutyl-1-methyl-4-phosphorinanone, 10 parts of aluminum isopropoxide and 50 parts of dry isopropyl alcohol is refluxed on a steam bath while solvent is slowly removed by distillation. When the distillate no longer contains acetone the remaining solvent is distilled off, and the residue hydrolyzed with cold dilute hydrochloric acid and extracted with ether. The ether solution is dried, solvent removed, and product fractionated, recovering 1-isobutyl-1-methyl-4-phosphorinanol.

EXAMPLE 20

*2,6-Dimethyl-1-Pentyl-4-Phosphorinanol*

Three parts of sodium metal cut into 0.25 inch cubes is added slowly to a mixture of 10 parts of 2,6-dimethyl-1-pentyl-4-phosphorinanone, 20 parts of ethanol and 6 parts of water, while temperature is kept at 10° C. to 15° C. by cooling. The resulting mixture is hydrolyzed by slow addition of 25 milliliters of cold water. The water layer which results is extracted with ether, the ether layer dried, solvent removed and the product, 2,6-dimethyl-1-pentyl-4-phosphorinanol purified by vacuum distillation.

It is obvious from Examples 1–18, above, that the 4-phosphorinanone reactants contemplated herein may be converted to their corresponding 4-phosphorinanols using LiAlH$_4$ and a wide range of conditions. Temperatures below the boiling point of the solvent are employed, generally in the range of 0° C. to 100° C., preferably from 25° C. to 60° C. On the basis of 10 parts of the 4-phosphorinanone reactant, usually at least about 3 parts of LiAlH$_4$ and at least about 25 parts of the inert ether solvent are employed. Recovery of the 4-phosphorinanol product is best carried out by extraction as particularly and illustratively described in Example 1, supra.

Catalytic hydrogenation by conventional means using platinum, nickel or copper catalysts is contemplated herein. Likewise, as illustrated in Example 19, above, aluminium alkoxide reduction, i.e., the conventional Meerwein-Ponndorf-Verley method, is within the purview of the instant discovery.

Still another general process herein contemplated is reduction with sodium metal and alcohol, such as a lower alkanol. Example 20, hereinabove, is typical. Generally, for every 10 parts of 4-phosphorinanone, at least about 3 parts of sodium and at least about 9 parts of alcohol, say, ethanol (in lieu of a lower alkanol, at least about 12 parts of higher alcohol solvent, such as cyclohexanol) may be employed.

The novel 4-phosphorinanols of the present invention are useful for sequestering, i.e., selectively complexing, metal ions in solutions such as, alcohols, benzene, ether, chloroform, acetone, and the like. Typical metal ions are nickel, cobalt, copper, iron, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. A 4-phosphorinanol of the formula

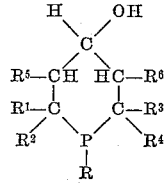

in which R represents a member selected from the group consisting of substituted and unsubstituted, branched and straight chain alkyl ($C_1$–$C_{18}$), cycloalkyl, and substituted and unsubstituted aryl, said substituents for alkyl being selected from the group consisting of lower alkoxy, phenyl and cyano, and said substituents for aryl being selected from the group consisting of halogen and lower alkyl; $R^1$, $R^2$, $R^3$ and $R^4$ each represent a member selected from the group consisting of hydrogen, lower alkyl, phenyl, lower alkyl-substituted phenyl, cyclohexyl and lower alkoxyalkyl; and $R^5$ and $R^6$ each represent a member selected from the group consisting of hydrogen, lower alkyl and phenyl.

2. 2,2,6,6-tetramethyl-1-phenylphosphorinanol.
3. 1-isobutyl-2,6-diphenyl-4-phosphorinanol.
4. 1-cyclohexyl-2,6-diphenyl-4-phosphorinanol.
5. 1-octyl-2,6-diphenyl-4-phosphorinanol.
6. 1,2,6-triphenyl-4-phosphorinanol.
7. 1-isobutyl-2,2,6,6-tetramethyl-4-phosphorinanol.
8. 1-cyclohexyl-2,2,6,6-tetramethyl-4-phosphorinanol.
9. 2,2,6,6-tetramethyl-1-octyl-4-phosphorinanol.

No references cited.